Jan. 13, 1970   A. V. JOBLING   3,489,033
CRANKSHAFTS
Filed April 2, 1968   3 Sheets-Sheet 1
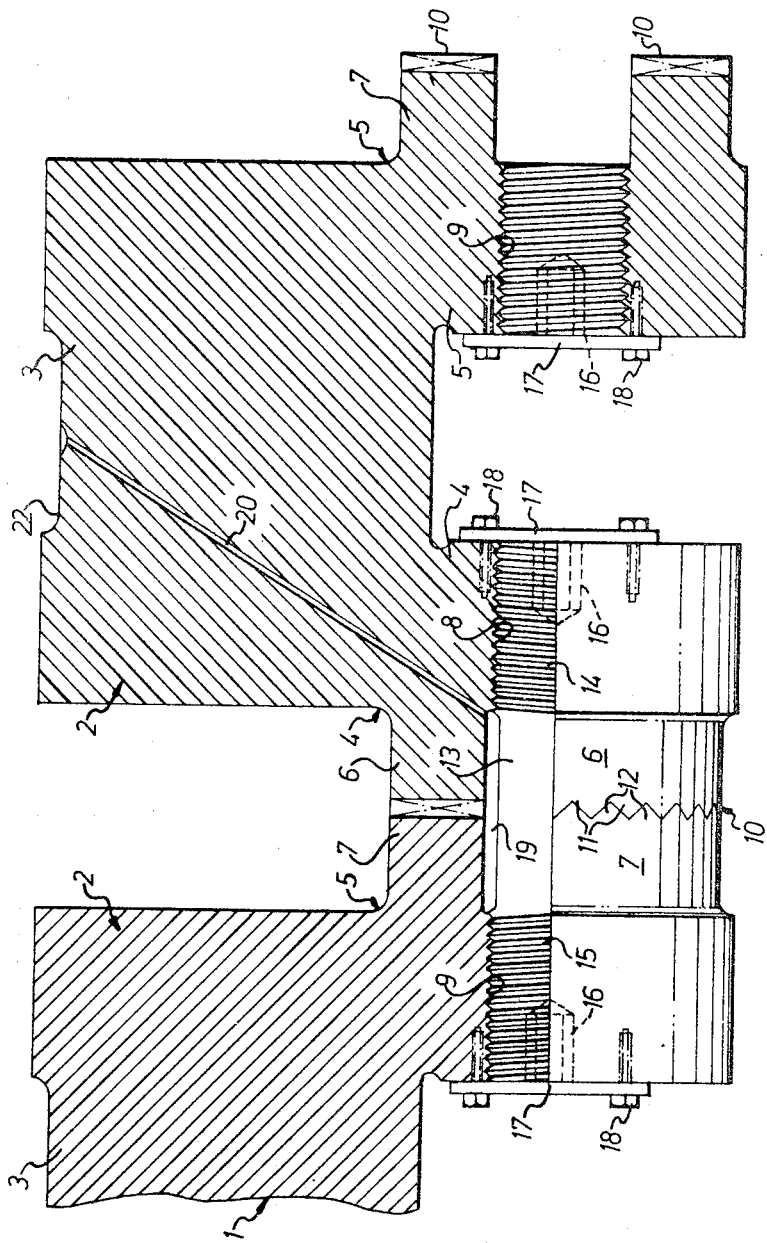
—FIG 1—
INVENTOR,
ALAN VIVIAN JOBLING
BY
Lowe & King
ATTORNEYS

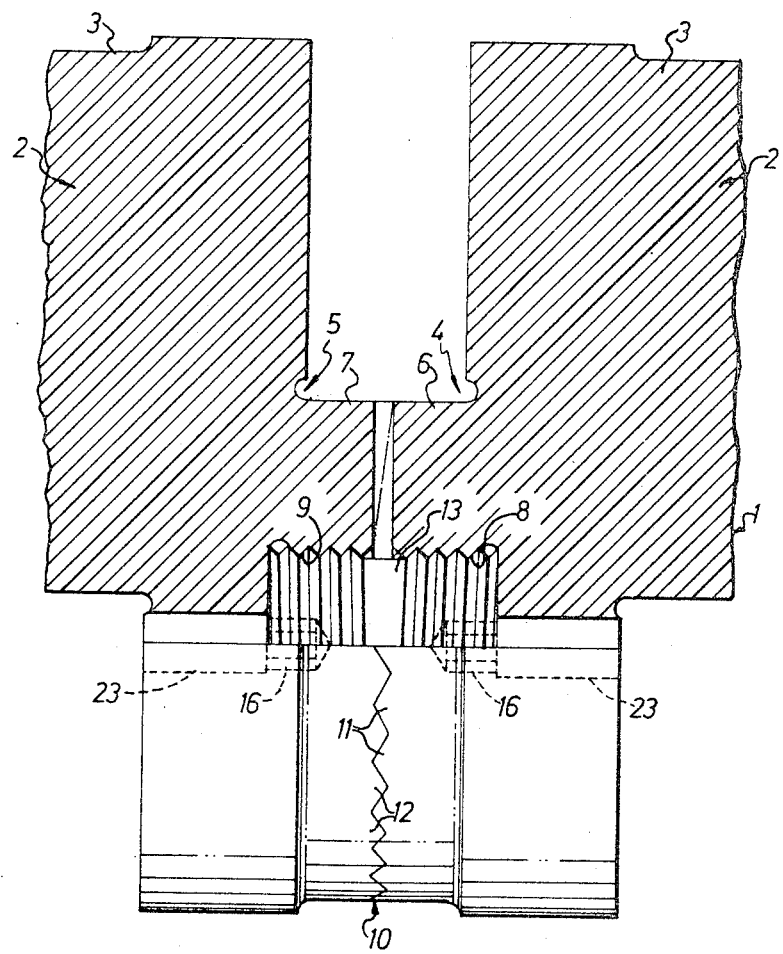
-FIG 2-

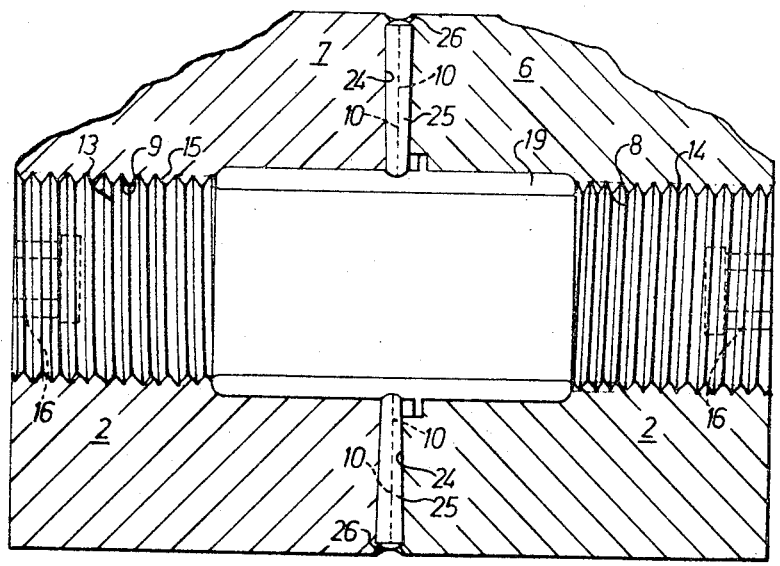
-FIG 3-

United States Patent Office 3,489,033
Patented Jan. 13, 1970

3,489,033
CRANKSHAFTS
Alan Vivian Jobling, Sheffield, England, assignor to English Steel Corporation Limited
Filed Apr. 2, 1968, Ser. No. 718,055
Claims priority, application Great Britain, Apr. 4, 1967, 15,400/67
Int. Cl. F16c 3/12
U.S. Cl. 74—598   9 Claims

ABSTRACT OF THE DISCLOSURE

A crankshaft of the type built up from a number of parts, each part consisting of a crankpin with a pair of integral webs and with a half journal extending from each web, has adjacent parts secured together by providing oppositely threaded bores in adjacent half journals in which adjacent bores is screwed a stud each end of which has an appropriate thread for each bore, so that two adjacent parts are drawn together as the stud is rotated, and the mating endfaces of adjacent half journals are formed so as to produce a torque transmitting joint.

---

This invention relates to crankshafts and is concerned with the manufacture in particular of large crankshafts, i.e., crankshafts of considerable length and/or large pin and journal diameters.

The methods generally available for the manufacture of crankshafts for high speed and medium speed diesel engines are drop-forging for the smaller sizes and forging by continuous grain flow processes or machining from block forgings for the larger sizes. However, the larger sizes require very expensive special purpose machines for forging, machining and grinding, and, if manufactured in one piece, present further difficulties in heat treatment if higher tensile steels are employed and surface hardening of pins and journals is required.

It is known to fabricate large crankshafts for slow speed diesel engines from single "throws", each comprising a crankpin and two webs, with adjacent journals shrink-fitted into bores in the webs. The crankshafts, however, usually have a throw which is appreciably larger than the pin and journal diameters, so that the bores in the webs are spaced far enough from the pins to prevent the occurrence of abnormally high stress in the webs. With smaller medium-speed diesel engine crankshafts the throw is generally close to or less than the pin and journal diameters so that the latter are close to each other or even overlap and hence the above method of fabrication is impracticable. In any case, a simple shrink fit is not too reliable for transmitting torque.

It is also known to fabricate large crankshafts from individual pins, webs, and journals, with torque transmitting joints between the pins and webs and between the webs and journals, and bolts extending through the webs and pins and through the webs and journals to secure the parts together, the torque-transmitting joints usually being of the "Hirth" type with radial serrations or splines or of the "Curvic" (registered trademark) type with generated curved teeth. However, the need for four joints per throw can lead to inaccuracies in alignment of the journals and the pins may also require finish grinding after assembly of the complete crankshaft. Furthermore, difficulty again arises where the throw is close to or less than the pin and journals diameters, because there is insufficient room in the webs to accommodate clamping bolts of adequate size and strength.

The object of the invention is to provide a fabricated crankshaft having substantially the simplicity of the first of the above-mentioned known types and the reliability in transmitting torque of the second.

According to the present invention, a crankshaft comprises at least two parts, each consisting of at least one crankpin integral with a pair of webs and at least one half journal integral with one of the webs, the half journal of one part having a right-hand threaded axial-bore and the half journal of the other part having a left-hand threaded axial bore, together with a stud with right-hand and left-hand threaded ends for screwing into the half journals and means for effecting rotation of the stud to draw the half journals together, and the half journals having mating endfaces formed for providing a torque-transmitting joint.

Each part may be formed by drop forging, press forging, casting, or a combination of these processes, and may have more than one crankpin, according to its amenability to the forging methods available, the or each crankpin being finish machined (including finish-grinding) before assembly of the complete crankshaft. Only finish grinding of the journal or journals is required after assembly, an operation that presents no problems as the assembled crankshaft can be accommodated in a cylindrical grinding machine and will be in reasonable balance about its journal axis.

Either or both parts may be provided with another integral half journal, with similarly tapped axial bore and formed endface, together with a similar stud, for connection to a similar and oppositely tapped half journal on a driving flange or a shaft extension, which may be provided with a gear or pulley for an auxiliary drive, or on a similar crankshaft part. Alternatively, either or both parts may be provided with an integral full-length journal, with integral or attached driving flange or shaft extension with a gear or pulley for an auxiliary drive.

The endfaces of the half journals may be radially serrated or splined or machined with generated curved teeth, to form a torque-transmitting joint of the "Hirth" or "Curvic" (registered trademark) type. The number of serrations or splines or the number of teeth—as the case may be—can be so chosen that the parts can be assembled with one of a number of different angular relationships between adjacent throws, in accordance with the number of engine cylinders. Thus a number of serrations, splines, or teeth may be a multiple of 60, thereby making available relative angles of 30°, 60°, 90°, 120°, 180°, & c.

The endfaces of mating half-journals may be plain and provided with a series of equally spaced radial holes, the centre of each hole coinciding with the endfaces of the half-journals and accommodating a pin. In detail, this may be effected by pre-assembling the half-journals by bolting together in their correct angular configuration with just sufficient tightening force to prevent relative movement during subsequent operations. Accurate alignment can be ensured by any suitable means, e.g., by machining integral spigots before assembly or by means of a separate locating ring encircling the junction of the two half journals.

The radial holes may then be drilled through the annular thickness of the journals, the centres of the holes coinciding with the interface between the two halves. The drilled holes may then be opened out by means of a tapered reamer to receive taper pins having the same angle of taper. It is important that all the holes should be accurately matched with regard to their diameters at the outer surface of the journal and that the pins to be inserted should to be similarly matched. The number and diameter of the pins should preferably be such that their total projected area is approximately half the area of the annular end face of the half journals, and that the effective bearing area of the journal is not reduced more than absolutely necessary.

Then, the pre-assembled half-journals may be dismantled for the purpose of removing flash from the inner ends of the holes and cleaning out any swarf which may have accumulated in the bore as a result of drilling and reaming operations, the joint being reassembled and the taper pins placed in the holes.

The means for effecting rotation of the stud to draw the half journals together may be a recess in one or each end of the stud, the recess having a non-circular (e.g., hexagonal) cross-section for engagement by a corresponding key, spanner or wrench.

The tapped bores may extend the full-length of the half journals, or—as is preferable in the case of a crankshaft having a throw less than the diameter of the pins and journals so that the latter overlap—only part way along the half journals from their mating endfaces, a smaller hole being provided through the remainder of one or each of the half journals for access to the means for effecting rotation of the stud.

With either type of journal endface, the stud is preferably tightened to such an extent that the journal is pre-stressed to a degree ensuring substantially constant loading in operation. Considerable pre-stressing of the journal may be achieved by heating the stud before insertion; tightening sufficiently to give nominal contact between the mating endfaces, and allowing the stud to cool, the amount of pre-stressing being estmated from the degree of preheat. Alternatively, the stud can be tightened cold, with the aid of a lubricant, and the pre-stressing estimated from the torque applied to the stud or the measured extension of the stud due to tightening.

Again, with half journals with plain endfaces and radially tapered holes, pre-stressing may be effected by drawing up by the stud to bring the two endfaces into light contact and inserting the pins with a light but uniform pressure, and pre-stress is then applied by further tightening of the stud as described earlier. With this method the pins must be so dimensioned that after insertion as above their outer ends will be located just below the outer surface of the journal. A varient of, or addition to, this method is to have the taper pins so dimensioned that they stand proud by a pre-determined amount, and pre-stressing is then achieved by progressively pressing in the pins until their outer ends are again just below the surface of the journal. When used additionally, the initial tightening of the stud is sufficient to ensure adequate bedding of the threads before the taper pins are pressed home with either method or combination of methods the pins may be locked in position by burring over the lips of the holes by rolling, peening, or other suitable means, as a safeguard against their loosening under cyclic loading or vibration in service.

The stud may be locked against unscrewing, e.g., by a spigot extending into engagement with the or each tightening recess from a plate secured to the or each half journal by setscrews.

The stud preferably has a portion of reduced diameter between its threaded portions, to form a reservoir for lubricating oil, which can pass through clearances between the mating endfaces, e.g., tip clearances in radial serrations, from bearing surfaces of the journal, or if greater, flow is required, through passages, provided specifically for the purpose, e.g., by omitting one or more teeth from one or both halves of the joint or one or more pins and through passages extend one through each adjacent web of each crankshaft part from the reservoir to the bearing surfaces of the crankpins. Locking plates for the stud may serve as seals for the bores, or separate seals may be provided.

Although the invention is primarily concerned with the fabrication of crankshafts from individual throws, it may also be applied—as has already been indicated— to the fabrication of crankshafts from sections each with two or more throws manufactured and machined together in known manner, to form crankshafts of a length beyond the capacity of existing machines and equipment. On the other hand, exceptionally large crankshafts, or ones with complex web shapes, could have the crankpins also formed in two halves similarly to the journals.

The invention will now be further described, with respect to various embodiments shown in the accompanying drawings, in which:

FIGURE 1 is a longitudinal section through a crank-throw joined to an adjacent crank-throw at the mating interface of two adjacent half-journals;

FIGURE 2 is a view similar to FIGURE 1 but showing a modified joint; and,

FIGURE 3 is also a view similar to FIGURE 1 but showing only a pair of half-journals joined by a further modified joint.

In all figures, like reference numerals are used for like parts.

Thus, a crankshaft is indicated generally by reference numeral 1 and consists of at least two parts 2 each composed of a crankpin 3 provided with integral webs 4, 5. From the webs 4, 5 extend respectively half-journals 6, 7. In the half-journal 6 is provided a right-hand threaded axial bore 8, while in the half-journal 7 is provided a left-hand threaded axial bore 9. In FIGURES 1 and 2 end faces 10 of adjacent half-journals 6, 7 are radially machined to produce teeth 11 and 12, respectively, so as to be interengaging when a stud 13, with a left-hand threaded end 14 and a right-hand threaded end 15, is screwed into the bores 8, 9. A hexagonal recess 16 is provided in each end of the stud to enable the latter to be be rotated by insertion of a conventional Allen wrench or key.

As shown in FIGURE 1, the stud 13 is locked against unscrewing by a spigot extending from plates 17 into each recess 16, the plates 17 being secured by setscrews 18. A central portion 19 of each stud 13 is of reduced diameter to form a reservoir for lubricating oil, and a passage 20 extends from each reservoir to the bearing surface 22 of each crankpin 3.

As shown in FIGURE 2, the threaded axial bores 8 and 9 need not extend through the full thickness of the half-journals 6, and 7, respectively, but only part-way, with a hole 23 being provided through the remainder of each half-journal for access to the recess 16 for rotation of the stud 13.

With the embodiment shown in FIGURE 3, the endfaces 10 of the half-journals are plain and a series of equally spaced radial holes 24 (e.g. 30 for 8" diameter half-journals) are provided around the half-journals, with the centre of each hole coinciding with the abutting endfaces 10 and with each hole accommodating a tapered pin 25. The outer lips of the holes 24 are burred over as indicated at 26 to prevent their loosening.

Preferably the joints of FIGURES 1, 2 or 3 are pre-stressed by any of the methods previously outlined.

What I claim is:

1. A crankshaft comprising at least two parts, at least one crankpin integral with a pair of webs constituting each part, and at least one half journal integral with one of the webs, the half journal of one part being provided therein with a right-hand threaded axial bore and the half journal of the other part being provided therein with a left-hand threaded axial bore, a stud with right-hand and left-hand threaded ends for screwing into the half journals, means for effecting rotation of the stud, and mating endfaces being provided on the half journals to provide a torque transmitting joint.

2. A crankshaft as in claim 1, wherein said endfaces of the half journals are provided with radially generated teeth, to form said torque-transmitting joint.

3. A crankshaft as in claim 1 wherein said endfaces of the half journals are plain and provided with a series of equally spaced radial holes, the centre of each hole coinciding with the plane of said endfaces of the half journals, a torque-transmitting pin being accommodated in each hole.

4. A crankshaft as in claim 1, wherein the means for effecting rotation of the stud is a recess in at least one end of the stud.

5. A crankshaft as in claim 1, wherein the tapped bores extend the full length of the half journals.

6. A crankshaft as in claim 1, wherein the tapped bores extend only part way along the half journals.

7. A crankshaft as in claim 6, wherein an access hole is provided through the remainder of one of said half journals, and wherein the means for effecting rotation of the stud is a recess in said stud adjacent said access hole.

8. A crankshaft as in claim 1, wherein said stud is tightened sufficiently between the two crankshaft parts to cause the journal formed by said half journals to be pre-stressed, whereby to ensure substantially constant loading in operation.

9. A crankshaft as in claim 1, wherein the stud has a portion of reduced diameter between its threaded portions to form a reservoir for lubricating oil.

References Cited

UNITED STATES PATENTS

| | | | |
|---|---|---|---|
| 2,380,099 | 7/1945 | Dusevoir | 74—598 |
| 2,448,742 | 9/1948 | Smith-Clarke et al. | 74—598 |
| 2,735,314 | 2/1956 | Meile | 74—598 |

FRED C. MATTERN, Jr., Primary Examiner

F. D. SHOEMAKER, Assistant Examiner